US007454489B2

(12) United States Patent
Chauffour et al.

(10) Patent No.: US 7,454,489 B2
(45) Date of Patent: Nov. 18, 2008

(54) SYSTEM AND METHOD FOR ACCESSING CLUSTERS OF SERVERS FROM THE INTERNET NETWORK

(75) Inventors: Pascal Chauffour, Cagnes sur Mer (FR); Paolo Gerosa, Rome (IT); Eric Lebrun, Carros (FR); Valerie Mahe, Nice (FR)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 10/753,175

(22) Filed: Jan. 6, 2004

(65) Prior Publication Data

US 2005/0005006 A1    Jan. 6, 2005

(30) Foreign Application Priority Data

Jan. 7, 2003    (EP) ................................. 03368004

(51) Int. Cl.
    *G06F 15/173*    (2006.01)
(52) U.S. Cl. ................ 709/223; 709/225; 709/226; 709/227; 718/104; 718/105
(58) Field of Classification Search ................ 709/223, 709/225, 226–229; 718/104, 105
    See application file for complete search history.

(56) References Cited

U.S. PATENT DOCUMENTS 6,175,874 B1 *    1/2001    Imai et al. ................ 709/238
6,601,101 B1 *    7/2003    Lee et al. ................ 709/227

(Continued)

*Primary Examiner*—Ario Etienne
*Assistant Examiner*—Faruk Hamza

(74) *Attorney, Agent, or Firm*—Hoffman Warnick LLC

(57) ABSTRACT

A cluster system and method accesses from an internet network, a network server within one or a plurality of clusters, each cluster being identified by a single cluster public Internet Protocol (IP) address. The cluster system has a plurality of network servers organized in one of a plurality of clusters and a network load balancer system for selecting a destination network server in a cluster. Each cluster has one or a plurality of identical network servers, the network load balancer system being connected on one hand to an access routing device and on another hand to the plurality of network servers through a private network server subnet. The method includes the steps of at initialization time, on each network server defining, as a non-advertising alias, in an interface table, the public IP address of each cluster to which the network server belongs, and upon reception, by the network load balancing system, of a datagram having an IP header including a destination IP address field and a medium access control (MAC) header including a destination MAC address field, selecting a destination network server within the cluster corresponding to the cluster public IP address identified in the destination IP address field of the datagram IP header, replacing the destination medium access control (MAC) address field of the datagram MAC header by the MAC address of the selected destination network server, and sending the datagram through the private network server subnet, using the MAC address of the selected destination network server. Upon reception, by the destination network server, of the datagram sent by the network load balancing system, the MAC address in the destination MAC address field of the datagram MAC header is identified as being the MAC address of the selected destination network server, and the IP datagram is processed if the identified cluster public IP address in the destination IP address field of the datagram IP header, is defined as a non-advertising alias in the interface table of the destination network server.

13 Claims, 7 Drawing Sheets

U.S. PATENT DOCUMENTS

| | | | |
|---|---|---|---|
| 6,772,226 B1 * | 8/2004 | Bommareddy et al. | 709/245 |
| 6,856,591 B1 * | 2/2005 | Ma et al. | 370/216 |
| 6,880,089 B1 * | 4/2005 | Bommareddy et al. | 726/11 |
| 2003/0033428 A1 * | 2/2003 | Yadav | 709/238 |
| 2004/0260745 A1 * | 12/2004 | Gage et al. | 709/200 |

* cited by examiner

US 7,454,489 B2

SYSTEM AND METHOD FOR ACCESSING CLUSTERS OF SERVERS FROM THE INTERNET NETWORK

FIELD OF THE INVENTION

The present invention relates to communication on digital networks, and more particularly to a system and a method for accessing from an internet network, any one of a plurality of servers comprised in one or a plurality of separate, embedded or overlapping clusters in a private subnet.

BACKGROUND OF THE INVENTION

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

transmitting and receiving electronic mail ("SMTP" or "Simple Mail Transfer Protocol"), logging into remote computers ("Telnet"), and transferring files and programs from one computer to another ("FTP" or "File Transfer Protocol"), transmitting and receiving "HTTP" ("HyperText Transfer Protocol") pages.

TCP/IP

The TCP/IP protocol suite is named for two of the most important protocols:

a Transmission Control Protocol (TCP), and an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or internet Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

Uniform Resource Locators

A resource of the Internet is unambiguously identified by a Uniform Resource Locator (URL), which is a pointer to a particular resource at a particular location. An URL specifies the protocol used to access a server (e.g. HTTP, FTP, ...), the name of the server, and the location of a file on that server.

Clients and S rvers

TCP/IP is a peer-to-peer, connection oriented protocol. There are no master/slave relations. The applications, however use a client/server model for communications. A server is an application that offers a service to internet users; a client is a requester of service. An application consists of both a server and a client part which can run on the same or on different computer systems.

Users usually invoke the client part of the application, which builds a request for a particular service and sends it to the server part of the application using TCP/IP as transport vehicle.

The server is a program that receives a request, performs the required service and sends back the result in a reply. A server can usually deal with multiple requests (multiple clients) at the same time.

IP Router

A "Router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

Intranet

Some companies use the same mechanism as the Internet to communicate inside their own corporation. In this case, this mechanism is called an "Intranet". These companies use the same networking/transport protocols and locally based computers to provide access to vast amount of corporate information in a cohesive fashion. As this data may be private to the corporation, and because the members of the company still need to have access to public Internet information, to avoid that people not belonging to the company can access to this private Intranet coming from the public Internet, they protect the access to their network by using a special equipment called a Firewall.

Firewall

A Firewall protects one or more computers with Internet connections from access by external computers connected to the Internet. A Firewall is a network configuration, usually created by hardware and software, that forms a boundary between networked computers within the Firewall from those outside the Firewall. The computers within the Firewall form a secure sub-network with internal access capabilities and shared resources not available from the outside computers.

Often, the access to both internal and external computers is controlled by a single machine, said machine comprising the Firewall. Since the computer, on which the Firewall is, directly interacts with the Internet, strict security measures against unwanted access from external computers are required.

A Firewall is commonly used to protect information such as electronic mail and data files within a physical building or organization site. A Firewall reduces the risk of intrusion by unauthorized people from the Internet. The same security measures can limit or require special software for people inside the Firewall who wish to access information on the outside. Depending on the requirements, a Firewall can be configured using one or more of the following components:

Datagram-filtering router;

Application Level Gateway ("Proxy" or "Socks") for controlling the access to information from each side of the Firewall;

Circuit Level Gateway for relaying TCP and UDP (user datagram protocol) connections.

IP Addressing

IP addresses are used by the IP protocol to uniquely identify a host on the Internet. Strictly speaking, an IP address identifies an interface that is capable of sending and receiving IP datagrams. Each IP datagram (the basic data datagrams that are exchanged between hosts) comprises a source IP address and a destination IP address. IP addresses are represented by a 32-bit unsigned binary value which is usually expressed in a dotted decimal format. For example, 9.167.5.8 is a valid Internet address. An IP address is divided between a network and a host part, the first bits of the IP address specifying how the rest of the address is divided. The mapping between the IP address and an easier-to-read symbolic name, for example myhost.ibm.com, is done by the "Domain Name System" (DNS).

Internet Assigned Numbers Authority (IANA)

In order to be assured of any to any communication between servers in the Internet, all IP addresses have to be officially assigned by the Internet Assigned Numbers Authority (IANA). Many organizations use locally assigned IP addresses, basically comprised within reserved ranges of addresses for private Internets to avoid colliding with officially assigned IP addresses. These IP addresses cannot be routed on the Internet.

IP Subnets

Due to the explosive growth of the Internet, the principle of assigned IP addresses became too inflexible to allow easy changes to local network configurations. These changes might occur when:

A new type of physical network is installed at a location.

Growth of the number of hosts requires splitting the local network into two or more separate networks.

Growing distances require splitting a network into smaller networks with gateways between them.

To avoid requesting additional IP network addresses in case of changes, the concept of subnets has been introduced. The assignment of subnet can be done locally, as the whole network still appears to be one IP network to the outside world. The host number part of the IP address is subdivided into a network number and a host number. This second network is called "subnetwork" or "subnet". The subnetting is implemented in a way that is transparent to remote networks.

Private IP Addresses

An approach for the conservation of the IP address space, is the use of private IP addresses. This approach relaxes the rule that IP addresses are globally unique by reserving part of the address space for networks that are used exclusively within a single organization and that do not require IP connectivity to the Internet. Any organization can use addresses in particular ranges without reference to any other organization. However, because theses addresses are not globally unique, they cannot be referenced by hosts in another organization and they are not defined to any other external routers. Routers in network not using private addresses are expecting to discard all routing information regarding these addresses. Routers in an organization using private addresses are expected to limit all references to private addresses to internal links; they should neither advertise routes to private addresses to external routers nor forward IP datagrams comprising private addresses to external routers. Hosts having only a private IP address do not have IP layer connectivity to the Internet. All connectivity to external Internet hosts must be provided with "Application Level Gateways", often referred to as a "Proxy".

Network Address Translation

Network Address Translation (NAT) is based on the fact that only a small part of the hosts in a private network are communicating outside that network. If each host is assigned an IP address from the public IP address pool only when they need to communicate, then only a small number of public IP addresses are required. NAT is a solution for networks that have private IP address ranges and want to communicate with hosts on the Internet. In fact, most of the time, this can also be achieved by implementing a Firewall. Hence, clients that communicate with the Internet by using a Proxy or Socks server do not expose their addresses to the Internet, so their addresses do not have to be translated anyway. However, for any reason, when Proxy and Socks are not available or do not meet specific requirements, NAT can be used to manage the traffic between the internal and external network without advertising the internal host addresses.

Load Balancing

The concepts of scaling, balancing and availability are particularly important when looking for effective ways of dealing with the ever increasing amount of network and server load. The concept of "balancing" refers to sharing, or distributing, a load among multiple devices within a server or a network, or both, to facilitate traffic flows.

Assigning applications with client connections to a specific network server may overload the capacity of this network server, while other network servers with fewer connection requests to other applications may waste free capacity. To reach the goal for an equal level of load of all network servers, these network servers are organized in a clustered server group. All network servers in this cluster can provide information about their workload to a load balancer. This load balancer is responsible for distributing connection requests from clients to the network servers, based on workload information. Clients are not aware of such clusters. They try to connect to a service, assuming it is running in the machine of the load balancer. The load balancer forwards the connection request to the real service provider based on the current workload of the network servers in the cluster. The information about the state of the workload can be provided by a function, such as a workload manager residing in every destination network server. In case there is no workload information from destination network servers, the network load manager, can use distribution rules, such as:

a simple round-robin distribution, number of distributed connections.

Dispatcher

There are may vendors currently offering load balancing hardware or software. The techniques used vary widely, and have advantages and disadvantages.

Early solutions to address load balancing were often located at the point where host names are translated into actual IP addresses: the Domain Name System. By rotating through a table of alternate IP addresses for a specific service, some degree of load balancing is achieved. This method is often called round-robin DNS. The advantages of this approach are that it is protocol compliant and transparent both to the client and the destination host. Unfortunately, this approach is sometimes defeated by the fact that intermediate name servers and client software cache the IP addresses returned by DNS service, and ignore an expressly specified time-to-live value particularly if the time-to-live is short or zero. As a result the balancing function provided by the DNS is bypassed, because the client continues to use a cached IP address instead of resolving again.

A Dispatcher uses a fundamentally different approach to load balancing. The Dispatcher does not use DNS in any way, although normal static DNS will still usually be used in front of the Dispatcher. Once installed and configured, the Dispatcher actually becomes the site IP address to which clients send all datagrams. This externally advertised address is referred to as the cluster address. The ports that should be supported inside each cluster can be configured, and then the actual network servers that will provide the service on each of those ports. Optionally, the real IP addresses of the network servers in the cluster can be concealed from the clients by filtering them at the gateway router.

The Dispatcher examines only the header of each datagram and decides whether the datagram belongs to an existing connection, or represents a new connection request. It uses a simple connection table stored in memory to achieve this. Note that the connection is never actually set up on the Dispatcher machine (it is between the client and the network server, just as it would be if the Dispatcher were not installed) but the connection table records its existence and the address of the network server to which the connection was sent.

If the connection already exists, which means it has an existing entry in the in-memory connection table, then the datagram is rapidly forwarded to the same network server chosen on the initial connection request without further processing. Since most of the datagrams that flow are of this type, the overhead of the whole load balancing process is kept to a minimum.

If the datagram is a new connection request, the Dispatcher looks at the configuration to see which network servers can support a request on the port requested by the client on the requested cluster address. Then it uses stored weights for each such network server to determine the right network server to which the connection will be forwarded. An entry mentioning this network server is made in the connection table, ensuring that subsequent datagrams for this connection are correctly forwarded to the chosen network server.

Note that the right network server is not always the best network server, since it is desirable for all eligible network servers to process their share of the load. Even the worst network server needs to shoulder some of the burden. If traffic is only ever forwarded to the best network server, it can be guaranteed that it will rapidly cease to be the best.

The Dispatcher does not modify the client's IP datagram when forwarding it. Because the Dispatcher is on the same subnet as its clustered network servers, it simply forwards the datagram explicitly to the IP address of the chosen network server, just like any ordinary IP datagram. The Dispatcher's TCP/IP stack modifies only the datagram's MAC (Medium Access Control) address in the operating system approved manner and sends the datagram to the chosen network server.

To allow the TCP/IP stack on that network server to accept the unmodified datagram from the Dispatcher and pass it to the chosen port for normal application processing, the IP address of the Dispatcher machine is also installed as a non-advertising alias on each of the clustered network servers. This is achieved by configuring the alias on the loopback interface.

The network server's TCP then establishes the server-to-client half of the connection according to standard TCP semantics, by simply swapping the source and destination addresses as supplied by the client, rather than determining them from its own basic configuration. This means that it replies to the client with the IP address of the Dispatcher. As a direct result, the balancing function is invisible both to the client and the clustered network servers.

A key performance and scaleability benefit of the Dispatcher is that the application server returns the response to the client's request directly to the client without passing back through the Dispatcher. Indeed, there is no need even to return using the original physical path; a separate high-bandwidth connection can be used. In many cases, the volume of outbound server-to-client traffic is substantially greater than the inbound traffic. For example, Web page HTML and imbedded images sent from the network server are typically at least 10 times the size of the client URLs that request them.

Because the Dispatcher is a truly generic TCP/IP application, its functions can be applied not only to HTTP (Hypertext Transfer Protocol) or FTP (File Transfer Protocol) traffic, but also to other standards-compliant types of TCP (Transmission Control Protocol) and UDP (User Datagram Protocol) traffic.

NAT Based Load Balancing

What follows is a consideration of the NAT-based load balancing mechanism in comparison to the approach used by the Dispatcher.

The only solution to communicate between a private network based on private IP addresses and a public network (as the Internet) using an application protocol for which there is no application gateway, is to establish a connectivity at the IP level between hosts in the private network and host on the Internet. Since the routers in the Internet don't know how to route IP datagrams back to a private IP address, it is not possible to send IP datagrams with private IP addresses as source IP addresses through a router into the Internet.

The NAT transparently translates the private IP addresses of a private network to public IP addresses so that IP datagrams can be routed on the Internet. The NAT dynamically translates the private IP address of outgoing datagrams to a public IP address. For incoming datagrams, the NAT translates the public IP address to a private IP address. For the point of two hosts that exchange IP datagrams between each other, one host being connected to a secure network (the private network) and the other one being connected to a non secure network (the Internet), the Network Address Translator (NAT) looks like a standard IP router that forwards IP datagrams between two networks interfaces.

Since the TCP/IP stack that implements NAT looks like a normal IP router, there is a need to create an appropriate IP network design for connecting two or more IP networks or subnets through a router. The NAT IP addresses need to come from separate networks or subnets, and the addresses need to be unambiguous with respect to other networks or subnets in the non-secure network. If the non-secure network is the Internet, the NAT addresses need to come from a public network or subnet, in other words, the NAT addresses need to be assigned by IANA (Internet Assigned Numbers Authority).

The non-secure addresses (official addresses) should be reserved in a pool, in order to use them when needed. If connections are established from the secure network, NAT can just pick the next free public address in the NAT pool and assign that to the requesting secure host. NAT keeps track of which secure IP addresses are mapped to which non-secure IP addresses at any given point in time, so it will be able to map a response it receives from the non-secure network into the corresponding secure IP address.

The NAT-based load balancing system works by modifying the source and destination IP addresses in the inbound client-to-server datagrams and by restoring the IP addresses to their original values in the outbound server-to-client datagrams. Note that if NAT is to be transparent to the network server, eliminating the need for specialized agent code on the network server, then all datagrams sent back to the client must pass back through the NAT-based load balancing system in order to restore the IP addresses originally used by the client in comparison to the previously discussed mode of the Dispatcher. This is a significant overhead which will have a varying impact on the NAT-based load balancing system and the network servers whose resources it manages. This added overhead and latency can mean network delay, and queuing in the NAT-based load balancing system itself. This in turn drastically limits the potential scaleability of NAT solutions. To overcome such delays, the capacity of a NAT-based load balancing system must not only be sufficient to handle both inbound and outbound datagrams, but it must also be able to cope with the disproportionately higher volume of the outbound traffic. This is completely different to previous approach where the Dispatcher does not modify datagrams and only sees the inbound flows.

NAT-based load balancing offerings sometimes enforce the need to see both inbound and outbound requests by obliging the customer to install the NAT device as a bridge without permitting bridges of any other kind. This forces to put the network servers on to what is essentially a private segment, which can complicate installation since it requires significant physical change to existing network infrastructure. All traffic for those network servers must pass through the NAT-based load balancing system whether the traffic is to be load-balanced or not. This means that if the application uses, for instance, a back-end SQL database, which might be running on a mainframe in a corporate data center, it also must be logically inside this "padded cell" from a TCP/IP networking point of view. The only alternative is to have all of the SQL query traffic and responses to the queries pass in and out through the NAT device, adding to the overhead.

Conversely the Dispatcher can be quickly and easily installed without disruption to the existing network infrastructure. For instance, there are no restrictions as to where the SQL database needs to be located. The configuration is simpler and a complete subnet layer is eliminated. The configuration offered by the Dispatcher is also more flexible.

The one advantage of NAT as originally conceived (the ability to forward datagrams to remote destinations across a wide area network) cannot be usefully deployed since the wide area network connection is behind the bridge and, therefore, can only be within the site's private network. Additionally, the same NAT device must still be the only exit from the wide area network link. Dispatcher's wide area support does not suffer from this limitation.

To attempt to overcome these limitations, some NAT solutions add to the overhead that is fundamental to NAT by providing unnecessary add-ons. For example, the capability to map one port address to another. This is implicitly at odds with the standards for well-known ports. This is often touted as an advantage for NAT-based solutions, but the so-called advantages of port mapping are of marginal value, and the same functionality can be deployed in other ways that are more standards-compliant.

To check if a server is up, NAT-based load balancing solutions need to sacrifice an actual client request, and so a server outage is typically perceived only as a result of a timeout of one of these real client requests. The use by a Dispatcher without NAT of specialized advisors is less disruptive and reacts more quickly to a failure.

NAT Devices often only map affinity or stickiness based on the client's IP address, and not at the port level. This means that once a client has contacted a server, then all traffic from that client that is intended for other applications is forwarded to the same network server. This drastically restricts configuration flexibility, in many cases rendering the sticky capability unusable in the real world.

More explanations about the technical field presented in the above sections can be found in the following publications incorporated herewith by reference: "TCP/IP Tutorial and Technical Overview" by Martin W. Murhammer, Orcun Atakan, Stefan Bretz, Larry R. Pugh, Kazunari Suzuki, David H. Wood, International Technical Support Organization, October 1998, GG24-3376-05.

OBJECTS OF THE INVENTION

An object of the present invention is to access from the Internet network any network server comprised in any cluster among a plurality of separate, overlapping or embedded clusters, each cluster having its own public IP address and comprising one or a plurality of network servers and each network server being part of one or a plurality of clusters.

It is a further object of the present invention to associate the public IP address of one or a plurality of clusters, with the MAC address of a destination network server comprised in said one or plurality of clusters.

It is a further object of the present invention to access from the Internet network, a network server part of a plurality of clusters, each cluster having its own cluster public IP address.

It is a further object of the present invention to use the load balancing services of a Network Load Balancer to select within a cluster identified by a cluster public IP address, a destination network server among one or a plurality of network servers.

It is a further object of the present invention to individually access from the Internet network, a particular network server within a cluster comprising a plurality of network servers.

SUMMARY OF THE INVENTION

The present invention discloses a cluster system and a method, as defined in independent claims, for use in a cluster system, for accessing from an internet network a network server within one or a plurality of clusters, each cluster being identified by a single cluster public Internet Protocol (IP) address, said cluster system comprising a plurality of network servers organized in one of a plurality of clusters and a network load balancer system for selecting a destination network server in a cluster, each cluster comprising one or a plurality of identical network servers, said network load balancer system being connected on one hand to an access routing device and on another hand to said plurality of network servers through a private network server subnet. The method comprises the steps of:

at initialization time, on each network server:
defining, as a non-advertising alias, in an interface table, the public IP address of each cluster to which the network server belongs;
upon reception, by the network load balancing system, of a datagram, said datagram comprising an IP header including a destination IP address field and a medium access control (MAC) header including a destination MAC address field:
selecting a destination network server within the cluster corresponding to the cluster public IP address identified in the destination IP address field of the datagram IP header;
replacing the destination medium access control (MAC) address field of the datagram MAC header by the MAC address of the selected destination network server;
sending the datagram through the private network server subnet, using the MAC address of the selected destination network server;
upon reception, by the destination network server, of the datagram sent by the network load balancing system:
identifying the MAC address in the destination MAC address field of the datagram MAC header as being the MAC address of the selected destination network server;
processing the IP datagram if the identified cluster public IP address in the destination IP address field of the datagram IP header, is defined as a non-advertising alias in the interface table of the destination network server.
Further embodiments of the invention are provided in the appended dependent claims.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

A/Prior Art

Dispatcher

A computer acting as server may receive simultaneous requests from various clients and may be not able to answer to these clients in a reasonable time frame. To solve this problem of data availability over the Internet, a server can be implemented using different computers: this set of servers acting as a single server is called a "cluster". However, an Uniform Resource Locator (URL) is normally associated with a single server computer. To hide from the clients the existence of a cluster, a special server computer, called Dispatcher, is used to simplify the access to the data on the different servers of the cluster. The Dispatcher:
can be accessed using a single Uniform Resource Locator (URL) or a single address called "VIP address" (Virtual IP address), or "cluster address", and
distributes requests from clients to less loaded servers in the cluster.

The Dispatcher is the site IP address to which clients send all requests. This externally advertised address is referred to as the cluster address. As many cluster addresses as needed can be defined.

The purpose of the Dispatcher is for each request received from a client connected to Internet:
to identify within the cluster, the right server in term of performance, for answering the request, and
to forward this request to the identified right server.

Figure 1:
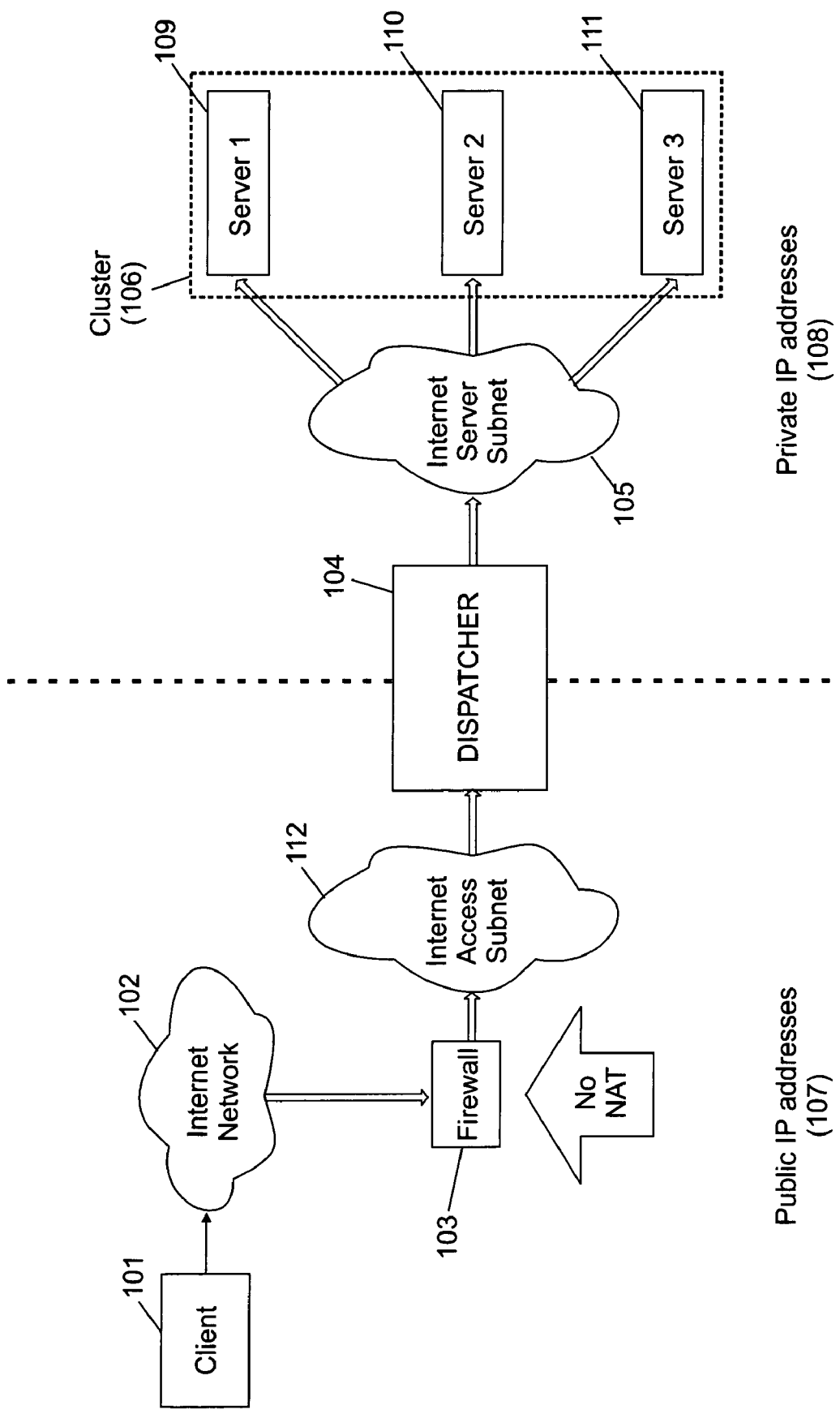
FIG. 1 is a physical view of a system for accessing from the Internet network, a cluster of network servers within a private network through a Firewall using the services of a Dispatcher according to the prior art.

FIG. 1 is a physical view of a cluster (106) of network servers (109, 110, 111) accessible through an access router, preferably a Firewall (103), and a Dispatcher (104). In this typical configuration, the Dispatcher (104) is physically connected to two different networks:
an Internet Access Subnet (112) where datagrams (for instance, HTTP requests) sent by clients (101) connected to the Internet network (102) are received after having been filtered by a Firewall (103). This Internet Access Subnet (112) is defined by a range of public IP addresses (107) assigned by the IANA (Internet Assigned Numbers Authority).
a Network Server Subnet (105) which is used to access the network servers (109, 110, 111). As the network servers are not directly connected to the Internet network (102), this subnet can be defined by a range of private IP addresses (108).

The Dispatcher (104) does not modify the IP datagrams sent by the clients (101) when it forwards them to the network servers: only the MAC addresses (source and destination) are updated.

Figure 2:
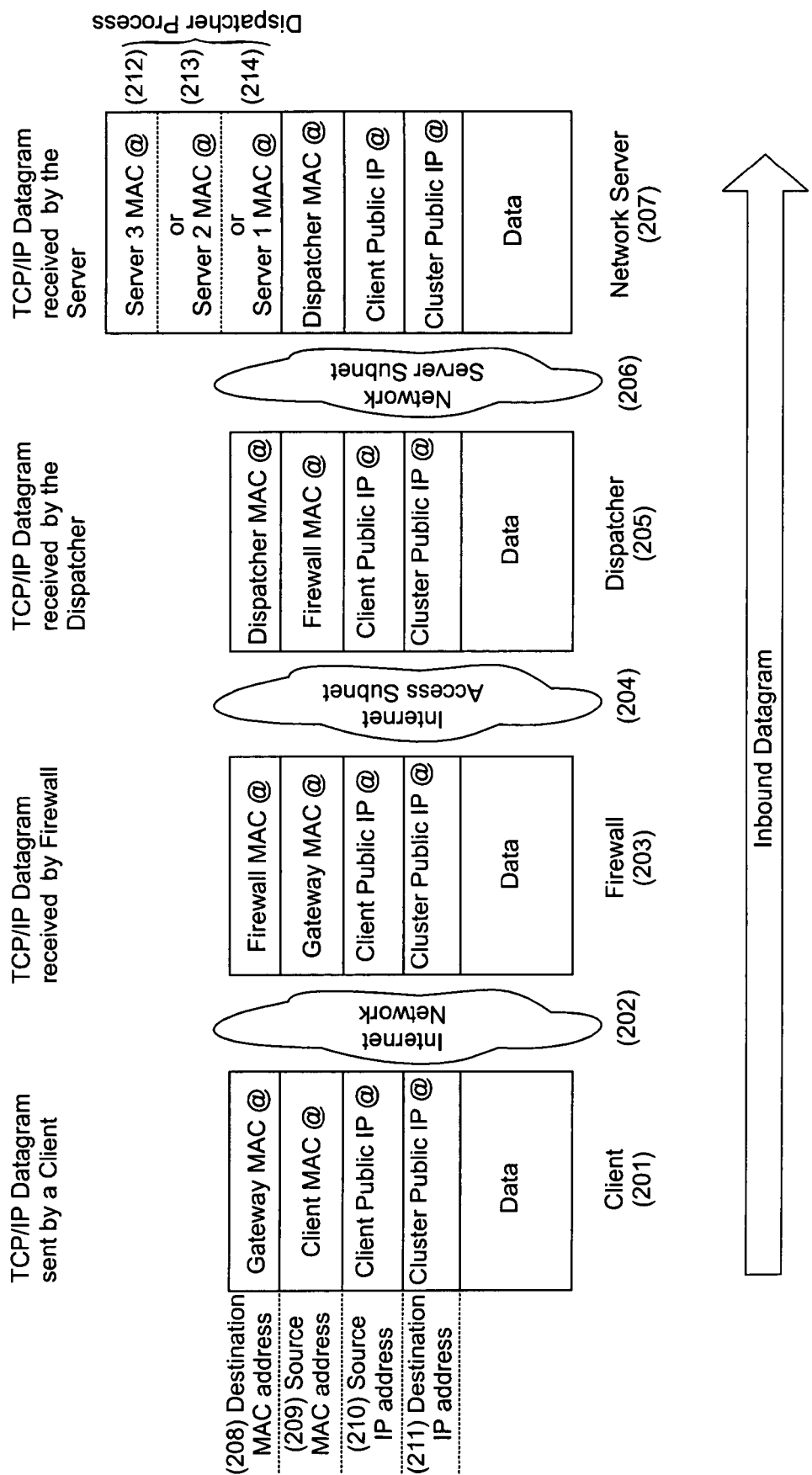
FIG. 2 is a logical view of a system for accessing from the Internet network, a cluster of network servers within a private network through a Firewall using the services of a Dispatcher according to the prior art.

FIG. 2, is a logical view of the load balancing system previously shown in FIG. 1. A client (101) connected to the Internet network (102) (202) sends an IP datagram (201) to an access router, preferably the Firewall (103). The destination IP address within the IP datagram is the cluster address (the public IP address defined to access the network servers of the cluster). The IP datagram (201) sent by the client (101) comprises:

as destination MAC address (208), the MAC address of the client's access router (gateway);

as source MAC address (209), the client MAC address;

as source IP address (210), the client public IP address as destination IP address (211), the cluster address (public IP address) defined to access the network servers (109, 110, 111).

The Firewall (103) forwards to the Dispatcher (104) ) via the Internet Access Subnet (112) (204), the IP datagram (203) received from the client (101) without modifying the source IP address (210) (client public IP address) and the destination IP address (211) (cluster address).

Upon reception of the IP datagram (205), the Dispatcher (104):

replaces the destination MAC address by the MAC address (212 or 213 or 214) of the selected network server (109 or 110 or 111). Because the MAC header is not part of the IP datagram, this change does not require the recalculation of the IP checksum of the IP datagram (207)

sends the IP datagram (207) to the selected network server (109 or 110 or 111) on the Network Server Subnet (206) (105).

To allow the TCP/IP stack on the network server:

to accept the IP datagram from the Dispatcher with the cluster address (the datagram does not contain the private IP address of the network server), and to forward it to the chosen port for normal application processing, the cluster address (Virtual IP address) is installed as a non-advertising alias on each network server (109, 110, 111) of the cluster (106). An alias is a second IP address to address the same computer. For not being advertised on the Network Server Subnet (105), the alias is configured on the loopback interface of each network server. The Firewall and the Dispatcher operate at the layer 2 (as a normal router) of the OSI model (Open Systems Interconnect) to change the destination MAC address. The Firewall is doing only filtering, and the Dispatcher is doing the layer 2 translation to access the destination network server in the cluster. The destination network server accepts the IP datagram because it has the right destination MAC address and public IP address (cluster address) defined in its internal network interface (loopback IP address).

The following public and private IP addresses are used to access the cluster of network servers through the Firewall and Dispatcher:

Three public IP addresses on the Internet Access Subnet, allow the communication with Internet:

the Firewall (103) has a dedicated public IP address.

the Dispatcher (104) has a dedicated public IP address.

the cluster (106) has a cluster address (public IP address) used by the client (101).

the Dispatcher (104) and each network server (109, 110, 111) have a private IP address.

The cluster address is defined as an alias in each network server (109, 110, 111) to allow the IP stack to process the IP datagram.

NAT Based Load Balancing

Figure 3:
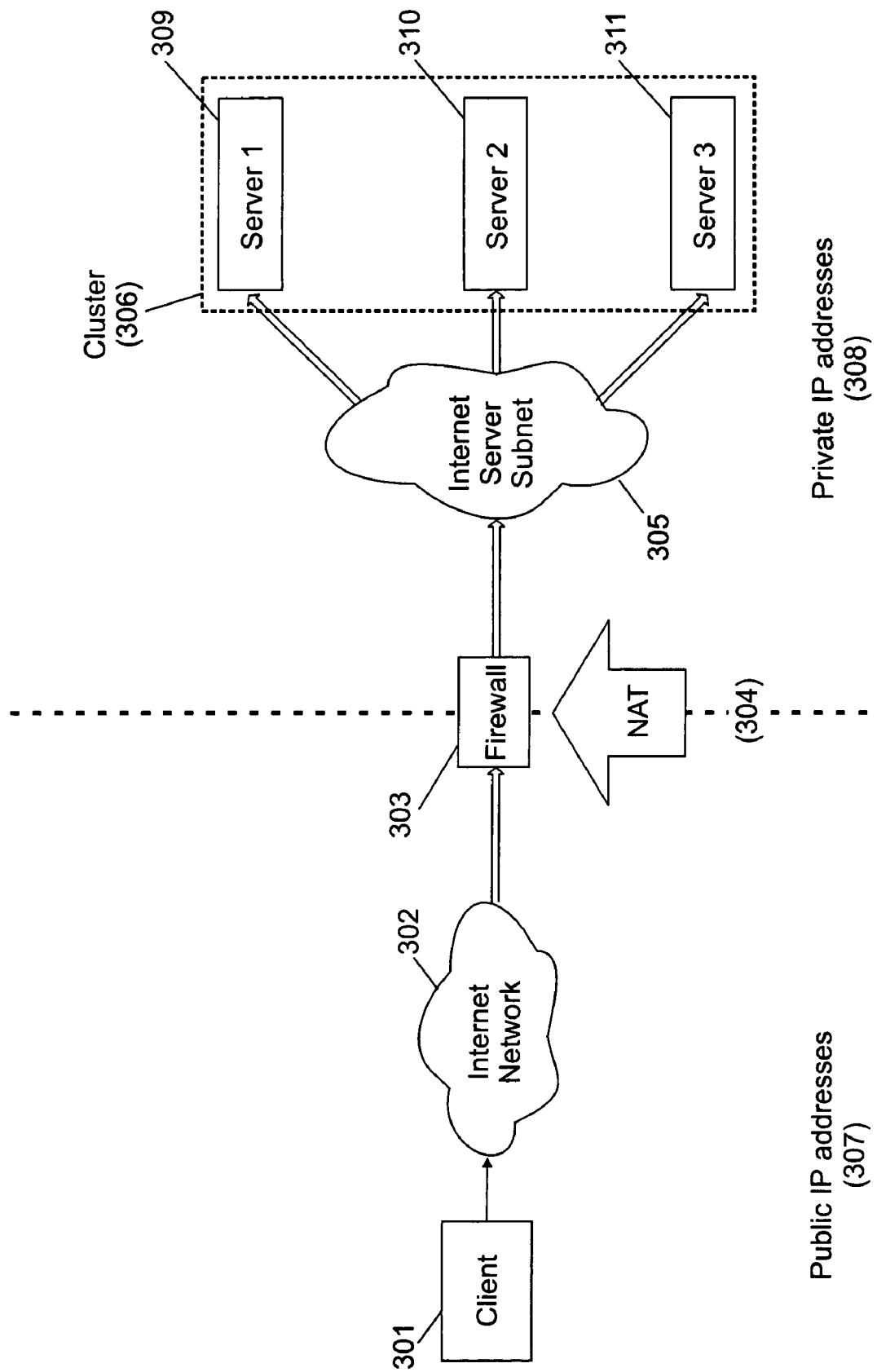
FIG. 3 is a physical view of a system for accessing from the Internet network, a cluster of network servers within a private network through a Firewall using services of a Network Address Translator (NAT) according to prior art.

FIG. 3 is a physical view of a NAT-based load balancing system comprising a cluster with a plurality of network servers (306) accessible through an access router, preferably a Firewall. In this typical configuration, the Firewall (303) is physically connected to two different networks:

an Internet network (302) where datagrams (for instance, HTTP requests) sent by clients (301) connected to the Internet (302) are received. This Internet network (302) is defined by a range of public IP addresses (307) assigned by the IANA (Internet Assigned Numbers Authority).

a Network Server Subnet (305) which is used to access the network servers (309, 310, 311). As the network servers are not directly connected to the Internet network (302), this subnet can be defined by a range of private IP addresses (308).

The Firewall protects the network servers (309, 310, 311) from the outside (from "hacker attacks" coming from the Internet network). The load balancing is based on the Network Address Translation (NAT) (304) wherein each network server public IP address (307) is translated to a private IP address (308).

Figure 4:
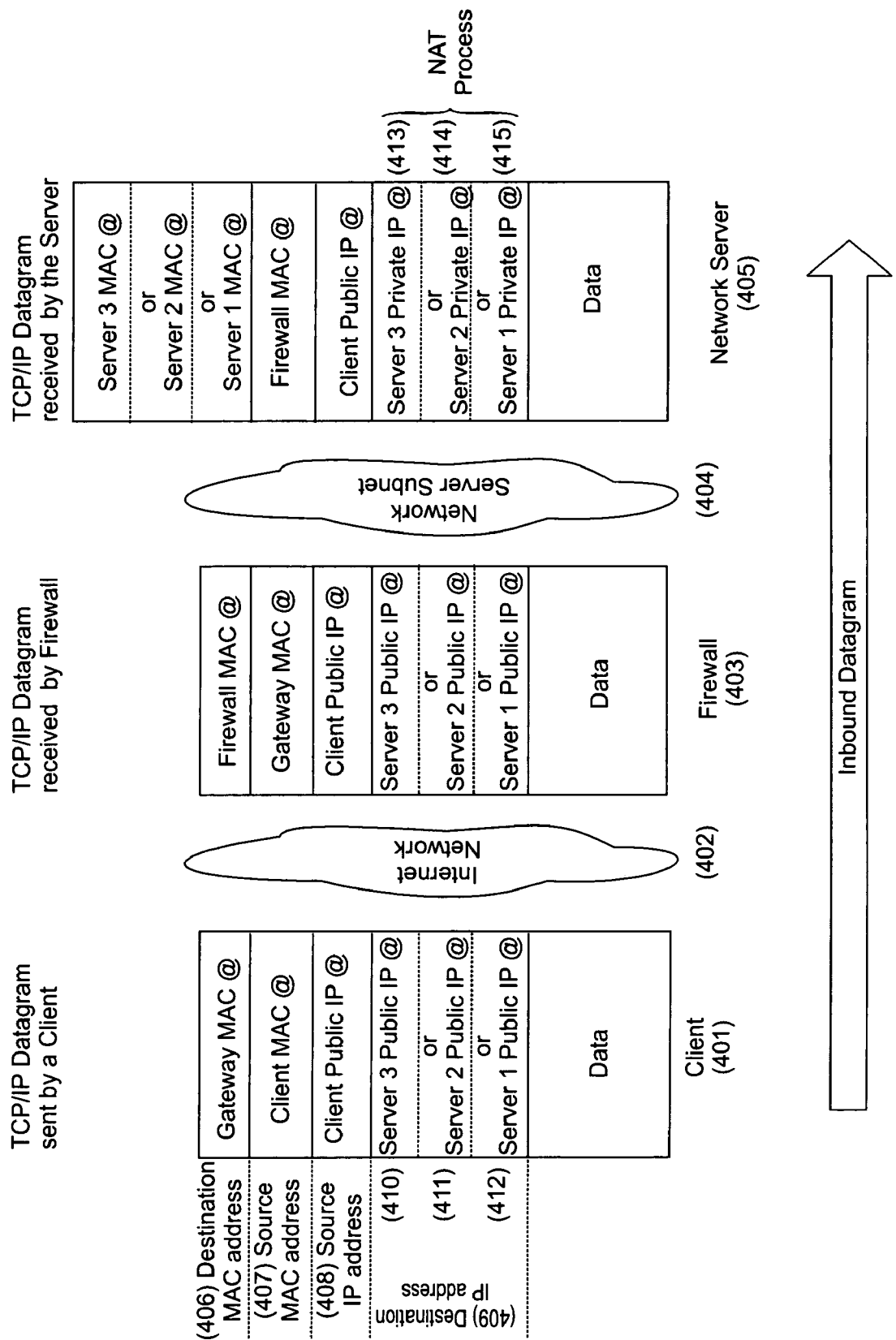
FIG. 4 is a logical view of a system for accessing from the Internet network, a cluster of network servers within a private network through a Firewall using the services of a Network Address Translator (NAT) according to prior art.

FIG. 4 is a logical view of the NAT-based load balancing system shown in FIG. 3. A client (301) sends an IP datagram (401) on the Internet network (302) (402) to access information on a network server (309 or 310 or 311) within the cluster (306). The IP datagram (401) sent by the client comprises:

as destination MAC address (406), the MAC address of the client's access router (gateway);

as source MAC address (407), the client MAC address;

as source IP address (408), the client public IP address as destination IP address (409), one of the three public IP addresses (410, 411, 412) used to access the network servers (309, 310, 311).

According to the NAT-based load balancing process, upon reception of the IP datagram (403), the Firewall (303):

replaces the public IP address (410 or 411 or 412) of the destination network server (309 or 310 or 311) by the corresponding private IP address (413 or 414 or 415);

recalculates the IP checksum of the IP datagram (405); and sends on the Network Server Subnet (305) (404), the IP datagram (405) to the destination network server (309 or 310 or 311).

The IP datagram (405) sends to the destination network server (309 or 310 or 311) comprises:

as destination MAC address (406), the MAC address of the destination network server;

as source MAC address (407), the Firewall MAC address;

as source IP address (408), the client public IP address;

as destination IP address, the private IP address of the destination network server.

NAT-based load balancing and Dispatcher are based on totally different concepts. Basically, the translation of the destination network server public IP address in a private address is done by the NAT at a layer 3 level when the Dispatcher works at a layer 2 level (Medium Access Control or MAC address). The Dispatcher has the possibility to receive all the IP datagrams sent to the cluster. For each IP datagram, the Dispatcher selects a network server within the cluster, replaces in the datagram, the Dispatcher MAC address by the MAC address of the selected network server, and sends the IP datagram to the selected network server. The result is:

a faster translation: the destination MAC address is replaced instead of the destination IP address which remains unchanged.

more scalability: a single public IP address can be used to access a plurality of network servers.

B/Invention

Separate clusters

Figure 5:
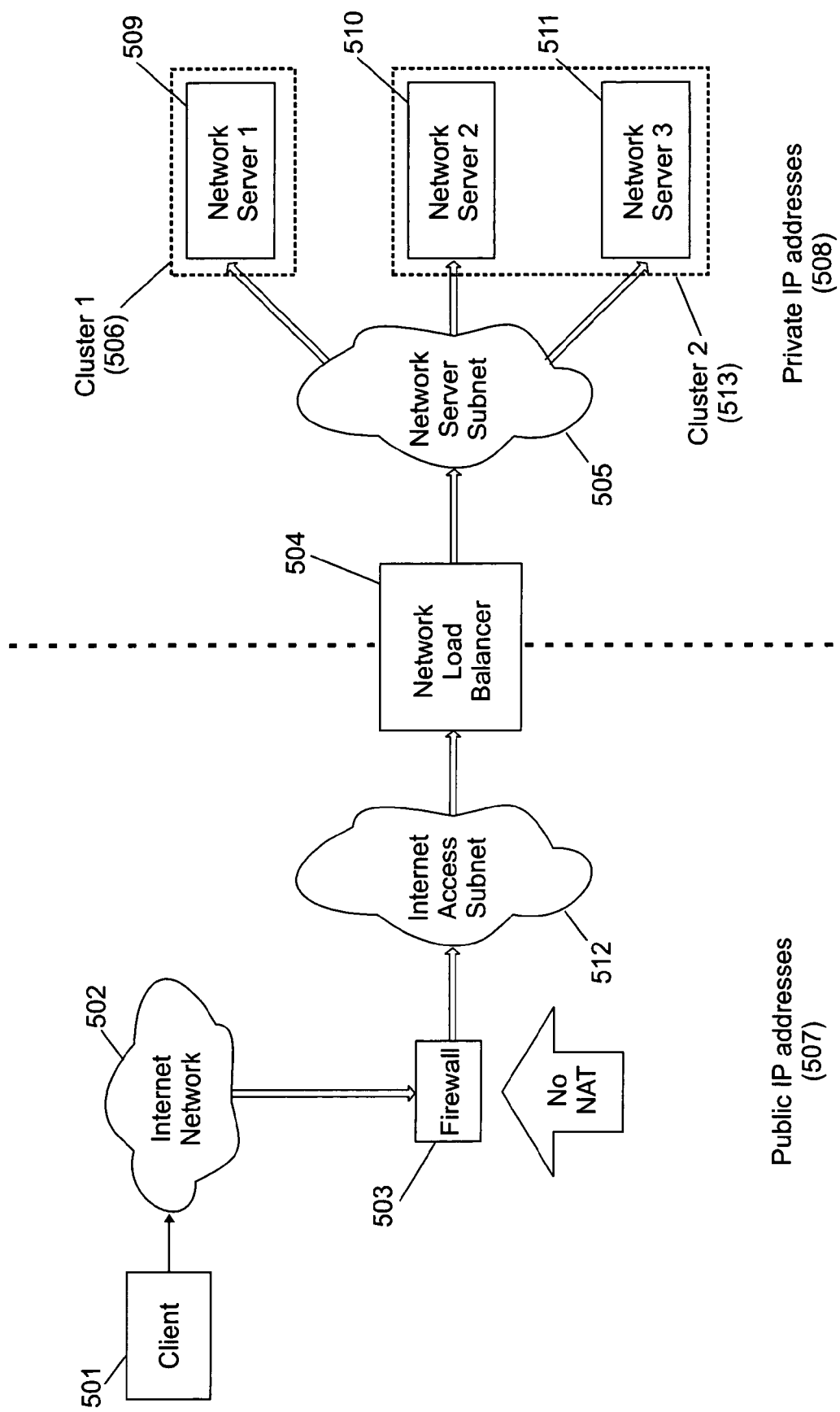
FIG. 5 is a physical view of a system for accessing from the Internet network, a plurality of separate clusters comprising one or a plurality of network servers within a private network through a Firewall using the services of a Network Load Balancer according to the present invention.

FIG. 5 is a physical view of a load balancing system according to the present invention comprising a plurality of separate clusters:

a first cluster (506) with a network server (509), and a second cluster (513) with a plurality of identical network servers (510, 511), accessible by a client (501) connected to the Internet network (502) through an access routing device (503) (a Firewall in a preferred embodiment) and a Network Load Balancer (504). In this typical configuration, the Network Load Balancer (504) is physically connected to two different networks:

an Internet Access Subnet (512) where datagrams (for instance, HTTP requests) sent by a client (501) connected to the Internet network (502), are received after having been filtered by the Firewall (503). This Internet Access Subnet (512) is defined by a range of public IP addresses (507) assigned by the IANA (Internet Assigned Numbers Authority).

a Network Server Subnet (505) which is used to access the network servers (509, 510, 511). As the network servers are not directly connected to the Internet network (502), this subnet can be defined as a private network using a range of private IP addresses (508).

It is important to note that within each cluster, network servers are identical.

The Network Load Balancer (504) does not modify the IP header (source IP address, destination IP address) of datagrams sent by the client (501) when it forwards them to the network servers. Only the MAC (Medium Access Control) address (or physical hardware address) in the MAC header of datagrams is modified. Because the Network Load Balancer is in the same physical medium as the network servers (509, 510, 511), it simply forwards each datagram to the destination network server using the MAC address of this destination network server, just like any ordinary datagram.

Figure 6:
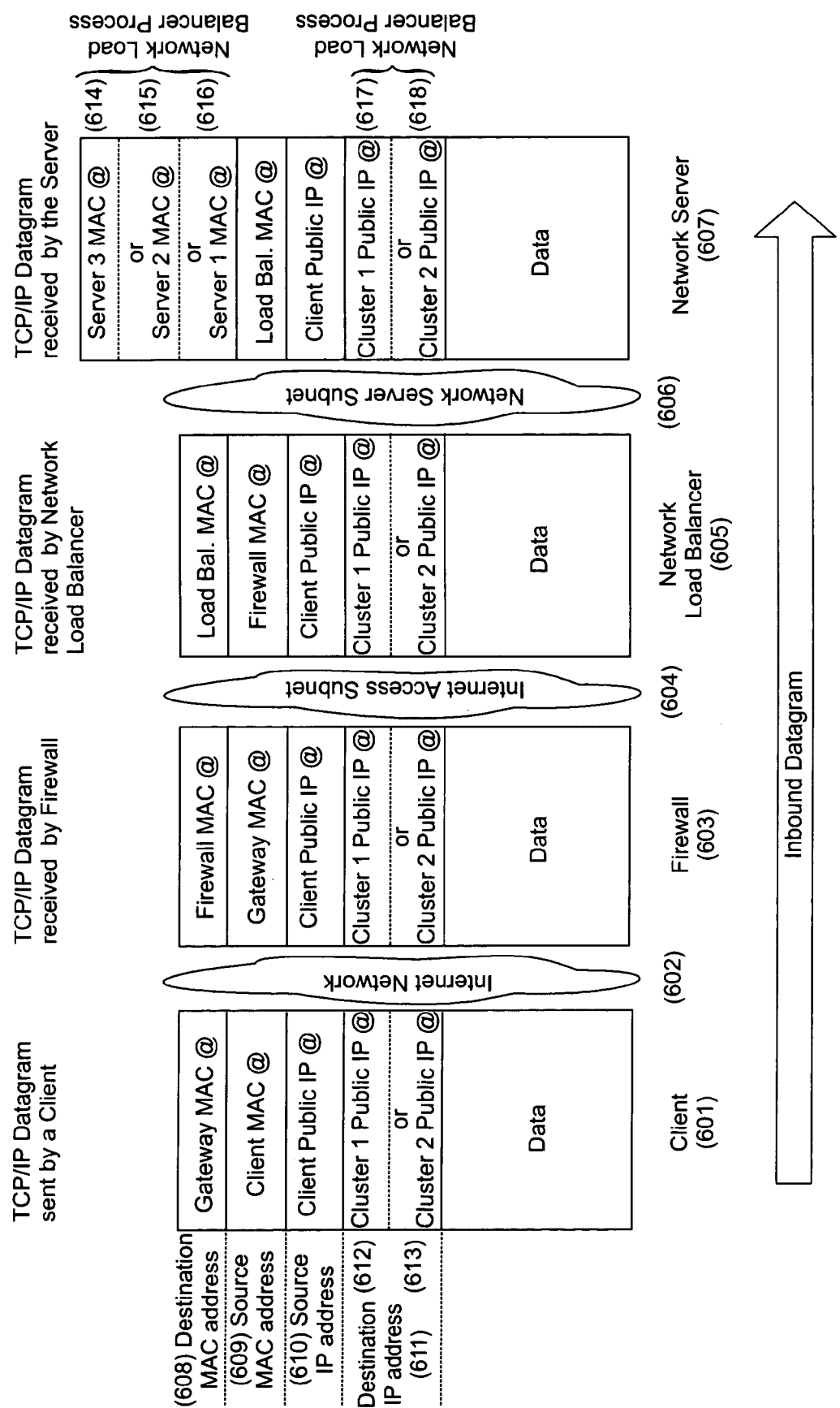
FIG. 6 is a logical view of a system for accessing from the Internet network, a cluster of network servers within a private network through a Firewall using the services of a Network Load Balancer according to the present invention.

FIG. 6, is a logical view of the load balancing system previously shown in FIG. 5. A client (501) connected to the Internet network (502) (602) sends an IP datagram (601) to the Firewall (503). The IP datagram (601) sent by the client (501) comprises:

as destination MAC address (608), a gateway MAC address (to allow the client to have access to the Internet network);

as source MAC address (609), the client MAC address;

as source IP address (610), the client public IP address as destination IP address (611), one of the following cluster public IP addresses:

the cluster public IP address (612), used to have access to a destination network server (509) comprised within the first cluster (506).

the cluster public IP address (613), used to have access to a destination network server (510, 511) comprised within the second cluster (513).

The Firewall (503) forwards to the Network Load Balancer (504) ) via the Internet Access Subnet (507) (604), the IP datagram (603) sent by the client (501) and received from the Internet network, without modifying the IP header (source IP address (610) and destination IP address (611)) of this datagram.

Upon reception of the IP datagram (605), the Network Load Balancer (504):

selects according to a specific algorithm a destination network server within the cluster associated with the cluster public IP address identified in the destination IP address field (611) of the datagram IP header;

replaces the destination MAC address in the MAC header of the datagram by the MAC address (614 or 615 or 616) of the selected destination network server (509 or 510 or 511). This change does not require the recalculation of the IP checksum of the IP datagram (607).

sends the IP datagram (607) to the selected destination network server (509 or 510 or 511) on the Network Server Subnet (606) (505) using the MAC address (614 or 615 or 616) of this selected destination network server.

To allow the TCP/IP stack on the selected destination network server:

to accept the IP datagram from the Network Load Balancer (504) with the cluster public IP address (611) (the IP datagram sent by the network load balancer does not comprise the private IP address of the selected destination network server), and to forward it to the chosen port for normal application processing, the cluster public IP address (Virtual IP address) is installed as a non-advertising alias on each network server (509, 510, 511). An alias is a second IP address to address the same computer. For not being advertised on the Network Server Subnet (505,606), the alias is configured on the loopback interface of each network server within each cluster.

The Firewall (503) and the Network Load Balancer (504) operate (as a normal router) at layer 2 of the OSI model (Open Systems Interconnect) to change the destination MAC address. The Firewall is doing only filtering, and the Network Load Balancer is doing the layer 2 translation to access the selected destination network server. The selected destination network server accepts the datagram because the destination MAC address in the MAC header of the datagram is its own MAC address, and the destination IP address in the IP header of the datagram is the public IP address defined in its internal network interface (loopback).

Overlapping or Embedded Clusters

Figure 7:
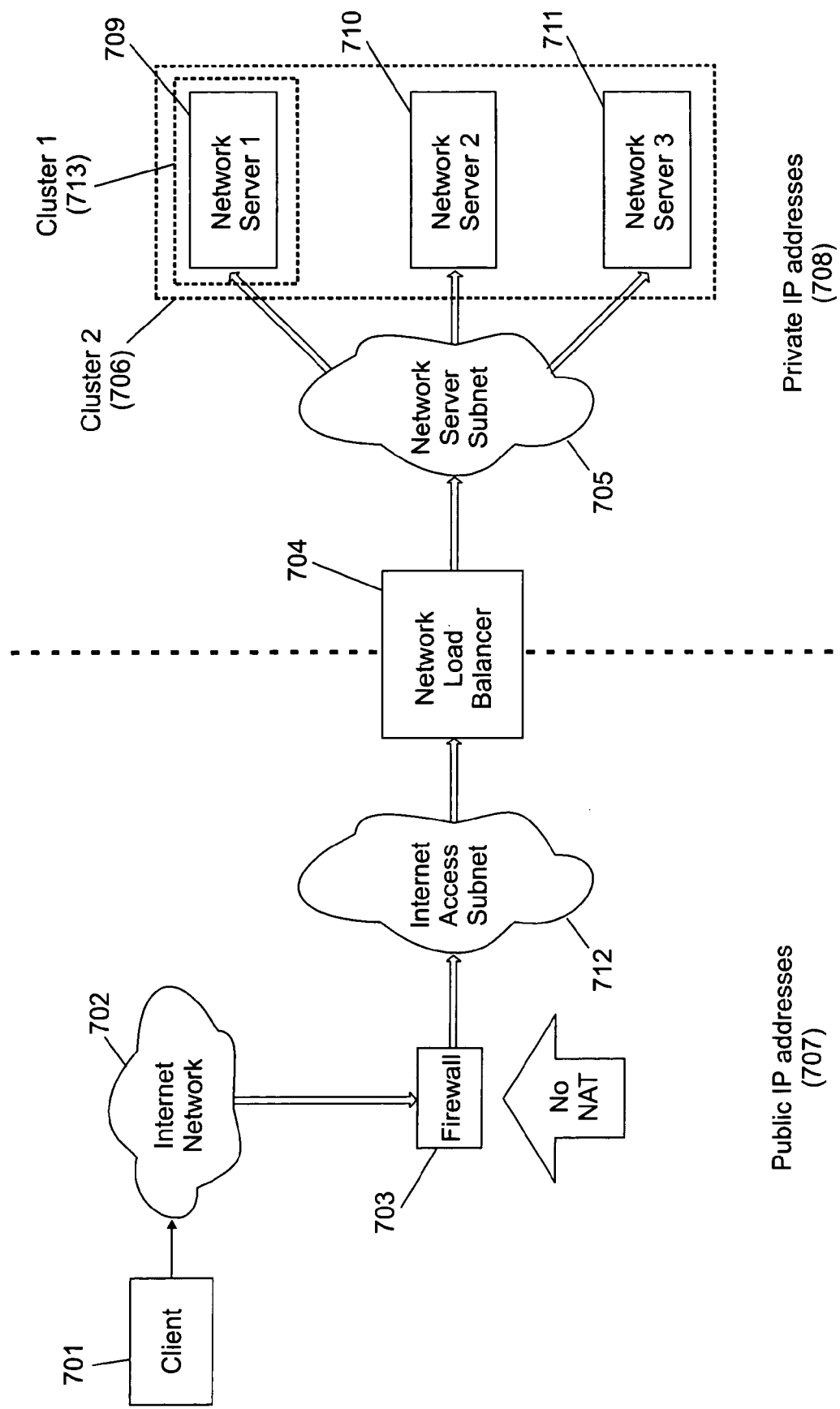
FIG. 7 is a physical view of a system for accessing from the Internet network, a embedded clusters comprising one or a plurality of network servers within a private network through a Firewall using the services of a Network Load Balancer according to the present invention.

FIG. 7 is a physical view of a remote access system according to the present invention comprising a plurality of clusters (706, 713) accessible by a client (701) connected to the Internet network (702) through an access routing device (703) (a Firewall in a preferred embodiment) and through a Network Load Balancer (704). In the example described in FIG. 7, the plurality of clusters comprises:

a first cluster (cluster 1 (713)) embedded within a second cluster (cluster 2 (706)), this first cluster (713) comprising one network server (709);

a second cluster (cluster 2 (706) with a plurality of identical network servers (709, 710, 711);

In this typical configuration, the Network Load Balancer (704) is physically connected to two different networks:

an Internet Access Subnet (712) where datagrams (for instance, HTTP requests) sent by a client (701), connected to the Internet network (702), are received after having been filtered by the Firewall (703). This Internet Access Subnet (712) is defined by a range of public IP addresses (707) assigned by the IANA (Internet Assigned Numbers Authority).

a Network Server Subnet (705) which is used to access the network servers (709, 710, 711). As the network servers are not directly connected to the Internet network (702), this subnet can be defined as a private network using a range of private IP addresses (708).

It is important to note that embedded or overlapping clusters have identical network servers. In the present example, network servers 1 (709), 2 (710), and 3 (711) are identical.

As already described in FIG. 6, a client (701) connected to the Internet network (702) sends an IP datagram (601) to the Firewall (703). The IP datagram (601) sent by the client (701) comprises:
- as destination MAC address (608), a gateway MAC address (to allow the client to have access to the Internet network);
- as source MAC address (609), the client MAC address;
- as source IP address (610), the client public IP address
- as destination IP address (611), one of the two following cluster public IP addresses:
  - the public IP address (612) of cluster 1 (713), to have access to the destination network server 1 (709) within this first cluster (713).
  - the public IP address (613) of cluster 2 (706), to have access to a destination network server (one among the network servers 1, 2, or 3) (709, 710, 711) within this second cluster (706), said second cluster including the network server 1 (709) also comprised in the first cluster (713).

The Firewall (703) forwards to the Network Load Balancer (704) ) via the Internet Access Subnet (707) (604), the IP datagram (603) sent by the client (701) and received from the Internet network, without modifying the IP header—source IP address (610) and destination IP address (611)—of this datagram.

Upon reception of the IP datagram (605), the Network Load Balancer (704):
- selects a destination network server within the cluster associated with the cluster public IP address identified in the destination IP address field (611) of the datagram IP header;
  - For the public IP address (612) of cluster 1, the network server 1 (709) is selected without using the load balancing services of the Network Load Balancer;
  - For the public IP address (613) of cluster 2, one among the network servers 1, 2 and 3 (709, 710, 711) is selected according to a specific algorithm.
- replaces the destination MAC address in the MAC header of the datagram by the MAC address (614 or 615 or 616) of the selected destination network server (709 or 710 or 711) within the cluster associated with the cluster public IP address. This change does not require the recalculation of the IP checksum of the IP datagram (607).
- sends the IP datagram (607) to the selected destination network server (709 or 710 or 711) on the Network Server Subnet (606) (705) using the MAC address (614 or 615 or 616) of this selected destination network server.

As illustrated in FIG. 7, a same network server can belong to more than one cluster (overlapping or embedded clusters) as it the case with network server 1 (709). Network server 1 can be accessed by a client connected to the Internet either by means of the public IP address of cluster 1 or by means of the public IP address of cluster 2. Because a single resource within the Internet cannot be defined by two different public IP addresses, two alias are defined on the loopback interface of network server 1, a first alias associated with the public IP address of cluster 1 and a second alias associated with the public IP address of cluster 2. To allow the TCP/IP stack, on the selected destination network server:
- to accept the IP datagram from the Network Load Balancer (704) (the IP datagram sent by the Network Load Balancer does not comprise the private IP address of the selected destination network server), and
- to forward the IP datagram to the chosen port for normal application processing, one or a plurality of cluster public IP addresses (Virtual IP address) are installed as non-advertising alias on each network server (709, 710, 711). An alias is a second IP address to address the same computer. For not being advertised on the Network Server Subnet (705, 606), the alias is configured on the loopback interface of each network server. In the present example:
  - on the loopback interface of network servers 2 (710) and 3 (711), the public IP address (613) of cluster 2 (706) is installed as a non-advertising alias, and
  - on the loopback interface of network server 1 (709),
    - the public IP address (612) of cluster 1 (713) is installed as a first non-advertising alias, and
    - the public IP address (613) of cluster 2 (706) is installed as a second non-advertising alias.

The selected destination network server accepts the datagram because:
- the destination MAC address in the MAC header of the datagram is its own MAC address, and
- the destination IP address in the IP header of the datagram is the public IP address or one of the plurality of public IP addresses defined in its internal network interface (loopback interface).

Access to Network Servers

The Network Load Balancer according to the present invention is the site which receives and forwards to network servers all datagrams sent by clients. Each cluster managed by the Network Load Balancer is identified by a specific cluster public IP address. The cluster public IP addresses are externally advertised on the Internet network by the Firewall. As many cluster public IP addresses as needed can be defined in the Network Load Balancer. One network server or a plurality of network servers can be configured per cluster. Clusters may be separate or may overlap or be embedded. Each network server comprised in a separate cluster belong to one and only one cluster. When clusters overlap or are embedded, a same network server may belong to a plurality of clusters.

Upon reception of a datagram, the Network Load Balancer examines only the IP header (source IP address and destination IP address) of the datagram and take the following decision:
- if the datagram belongs to an existing connection between a client and a cluster, the datagram is forwarded to the destination network server previously selected within the cluster corresponding to the destination IP address, or
- if the datagram represents a new connection request:
  - from a new client, a destination network server is selected according to a specific algorithm, within the cluster identified by means of the destination IP address in the datagram IP header and a connection is established between the new client and the destination network server, or/and
  - to a new cluster, a destination network server is selected according to a specific algorithm, within the new cluster identified by means of the destination IP address in the datagram IP header and a connection is established between the client and the destination network server in the new cluster.

The network Load Balancer uses a simple connection table stored in memory to achieve this. Note that the connection is never actually set up on the Network Load Balancer machine (it is between the client and the selected destination network server, just as it would be if the Network Load Balancer were not installed) but the connection table records its existence and the MAC address of the selected destination network server to which the connection was sent.

If the connection already exists, which means it has an existing entry in the in-memory connection table, then the datagram is rapidly forwarded to the same network server selected on the initial connection request without further processing (only the destination MAC address is updated in the datagram MAC header). Since most of the datagrams that flow are of this type, the overhead of the whole load balancing process is kept to a minimum.

If the datagram is a new connection request, the Network Load Balancer identifies the cluster by means of the destination IP address in the datagram IP header and determines in this cluster which network servers can support the client's request on the requested cluster public IP address. Then it uses stored weights for each such network server within the requested cluster to determine the right network server to which the connection will be forwarded. An entry mentioning this network server is made in the connection table, ensuring that subsequent datagrams for this connection are correctly forwarded to the selected network server.

The Network Load Balancer does not modify the client's datagram IP header when forwarding it. Because the Network Load Balancer is on the same physical medium as the clustered network servers, it simply forwards the datagram explicitly to the selected destination network server, just like any ordinary datagram. The Network Load Balancer modifies only the destination MAC (Medium Access Control) address in the operating system approved manner and forwards the datagram to the selected destination network server.

To allow the TCP/IP stack on the selected destination network server to accept the unmodified IP datagram from the Network Load Balancer and to pass it to the chosen TCP port for normal application processing, the public IP address of each cluster to which the network server belongs, is installed as a non-advertising alias. This is achieved by configuring on the loopback interface of each network server one or a plurality of alias depending on the network server is comprised in one or a plurality of clusters.

Advantages

The system and method according to the present invention has the following advantages:
- CPU time is saved in the Firewall, because the Firewall does not make any address translation between the IP public address and the the private IP address of the network server (as is done for the NAT-based load balancing system).
- The configuration of the Network Load Balancer is very easy. Only one public IP address (cluster public IP address) is defined per cluster.
- Within a cluster, a plurality of network servers can be accessed using a same public IP address (the cluster public IP address).
- For clusters comprising a plurality of network servers, the Network Load Balancer has the possibility to select a destination server by means of a specific algorithm. For instance the Network Load Balancer can decide to select the less loaded network server among the plurality of network servers in the cluster.
- The Network Load Balancer can use a different load balancing algorithm for each cluster.
- For maintenance, monitoring or other reasons, a network server within a cluster comprising a plurality a network servers, can be accessed individually from a remote workstation connected to the Internet without using the load balancing services of the Network Load Balancer. A second cluster embedded in the first cluster is defined with a particular cluster public IP address, said second cluster comprising the network server that is to be individually accessed. In this particular configuration, the network server can be remotely accesses either indirectly through the first cluster using the load balancing mechanism of the Network Load Balancer or directly and individually through the second cluster.
- Another Network Load Balancer can be configured for redundancy reasons, one being primary (in an active mode) and the second being secondary (in a standby mode). Only one Network Load Balancer is active at the same time (the primary). The secondary Network Load Balancer checks by sending "keep alive" frames if the primary Network Load Balancer is still alive.

While the invention has been particularly shown and described with reference to a preferred embodiment, it will be understood that various changes in form and detail may be made therein without departing from the spirit, and scope of the invention.

What is claimed is:

1. A method for use in a cluster system, for accessing from an internet network a network server within one or more of a plurality of clusters, every cluster being identified by a single cluster public Internet Protocol (IP) address, said cluster system comprising a plurality of network servers organized in one of a plurality of clusters and a network load balancer system for selecting a destination network server in a cluster, every cluster comprising one or a plurality of identical network servers, said network load balancer system being connected on one hand to an access routing device and on another hand to said plurality of network servers through a private network server subnet, said method comprising the steps of:
   at initialization time, on each network server:
   defining, as a non-advertising alias, in an interface table, the public IP address of every cluster of the plurality of clusters in the cluster system to which the network server belongs, wherein the plurality of clusters are designed such that the network server is able to belong to multiple clusters simultaneously;
   upon reception, by the network load balancing system, of a datagram, said datagram comprising an IP header including a destination IP address field and a medium access control (MAC) header including a destination MAC address field:
   selecting a destination network server within the cluster corresponding to the cluster public IP address identified in the destination IP address field of the datagram IP header;
   replacing the destination medium access control (MAC) address field of the datagram MAC header by the MAC address of the selected destination network server; and
   sending the datagram through the private network server subnet, using the MAC address of the selected destination network server; and
   upon reception, by the destination network server, of the datagram sent by the network load balancing system:
   identifying the MAC address in the destination MAC address field of the datagram MAC header as being the MAC address of the selected destination network server; and
   processing the IP datagram if the identified cluster public IP address in the destination IP address field of the datagram IP header, is defined as a non-advertising alias in the interface table of the destination network server.

2. The method according to claim 1, wherein the step of selecting a destination network server within the cluster corresponding to the cluster public IP address identified in the destination IP address field of the datagram IP header, comprises running a network load balancing algorithm for selecting the destination network server based on a current load of each server in the cluster if said cluster comprises a plurality of network servers.

3. The method according to claim 2, wherein said network load balancing algorithm is specific to each cluster, at least one cluster having a network load balancing algorithm that is different from a network load balancing algorithm that is specific to a different cluster.

4. The method according to claim 1, wherein one or a plurality of clusters comprise a single network server shared with one or a plurality of other clusters comprising other identical network servers.

5. The method according to claim 1, wherein said network load balancer system is redundant and comprises a network load balancer in an active state and a network load balancer in a standby state.

6. The method according to claim 1, wherein the access routing device is a firewall, and wherein the Firewall does not make any address translation between the IP public address and the private IP address of the network server.

7. A cluster system, comprising:
a plurality of network servers organized into one of a plurality of clusters, every said network server adapted to define at initialization time, as a non-advertising alias, in an interface table, the public IP address of every cluster of the plurality of clusters in the cluster system to which the network server belongs, wherein the plurality of clusters are designed such that the network server is able to belong to multiple clusters simultaneously;
a network load balancer system connected to said plurality of network servers through a private network server subnet, said balancer system adapted for upon reception of a datagram, said datagram comprising an IP header including a destination IP address field and a medium access control (MAC) header including a destination MAC address field, selecting a destination network server within the cluster corresponding to the cluster public IP address identified in the destination IP address field of the datagram IP header, replacing the destination MAC address field of the datagram MAC header by the MAC address of the selected destination network server, and sending the datagram through the private network server subnet using the MAC address of the selected destination network server;
an access routing device connected to said network load balancer through said private network server subnet; and
wherein said destination network server is adapted for identifying the MAC address in the destination MAC address field of the datagram MAC header as being the MAC address of the selected destination network server and for processing the IP datagram if the identified cluster public IP address in the destination IP address field of the datagram IP header is defined as a non-advertising alias in the interface table of the destination network server.

8. The cluster system of claim 7, wherein said network load balancer system is further adapted for running a network load balancing algorithm for selecting the destination server based on a current load of each server in the cluster if said cluster comprises a plurality of network servers.

9. The cluster system of claim 8, wherein said network load balancing algorithm is specific to each cluster, at least one cluster having a network load balancing algorithm that is different from a network load balancing algorithm that is specific to a different cluster.

10. The cluster system of claim 7, wherein one or a plurality of clusters comprise a single network server shared with one or a plurality of other clusters comprising other identical network servers.

11. The cluster system of claim 7, wherein said network load balancer system is redundant and comprises a network load balancer in an active state and a network load balancer in a standby state.

12. The cluster system of claim 7, wherein said access routing device is a firewall, and wherein the Firewall does not make any address translation between the IP public address and the private IP address of the network server.

13. The cluster system of claim 1, wherein the single cluster public Internet Protocol (IP) address is an only public internet defined for members of the cluster.

* * * * *